(12) United States Patent
Sugihara

(10) Patent No.: US 6,500,088 B2
(45) Date of Patent: Dec. 31, 2002

(54) LUBRICATING SYSTEM FOR TOROIDAL CONTINUOUSLY VARIABLE TRANSMISSION

(75) Inventor: Jun Sugihara, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/891,362

(22) Filed: Jun. 27, 2001

(65) Prior Publication Data

US 2002/0000345 A1 Jan. 3, 2002

(30) Foreign Application Priority Data

Jul. 3, 2000 (JP) ........................................ 2000-200460

(51) Int. Cl.$^7$ ............................................. B60K 17/35
(52) U.S. Cl. ............................................ 476/8; 476/10
(58) Field of Search ............................ 476/40, 42, 9, 476/10, 7, 8; 184/6.22

(56) References Cited

U.S. PATENT DOCUMENTS 4,939,900 A * 7/1990 Furumoto et al. ......... 184/6.17
6,109,031 A * 8/2000 Katagiri et al. ............... 60/431
6,142,906 A * 11/2000 Sakai et al. .................. 192/3.3

FOREIGN PATENT DOCUMENTS

| JP | 05039847 | 2/1993 |
| JP | 2002-21960 | * 1/2002 |

* cited by examiner

Primary Examiner—David Fenstermacher
(74) Attorney, Agent, or Firm—Foley & Lardner

(57) ABSTRACT

A lubricating system for a toroidal continuously variable transmission equipped with a trunnion rotatably supporting a power roller gripped between input and output disks so that a gyration angle of the power roller is variable, includes a first lubricating circuit provided for lubrication of a rolling contact surface on which the input and output disks are in friction-contact with the power roller, and a second lubricating circuit provided for lubrication of the trunnion and the power roller. Also provided in the first lubricating circuit is an oil-temperature control device that heats oil of the toroidal continuously variable transmission, so that the oil temperature-controlled by the oil-temperature control device is supplied through the first lubricating circuit into the rolling contact surface.

14 Claims, 3 Drawing Sheets

LUBRICATING SYSTEM FOR TOROIDAL CONTINUOUSLY VARIABLE TRANSMISSION

TECHNICAL FIELD

The present invention relates to the improvement of a lubricating system for a toroidal continuously variable automatic transmission for automotive vehicles.

BACKGROUND ART

One such toroidal CVT has been disclosed in Japanese Patent Provisional Publication No. 5-39847 (hereinafter is referred to as "JP5-39847"). The toroidal CVT is equipped with a lubricating system generally composed of a trunnion lubrication system mainly used for lubrication of spherical joints and needle bearings of upper and lower links and for lubrication and cooling of power rollers and input and output disks, and a rolling contact surface lubrication system used for lubrication of rolling contact surfaces between the power roller and input and output disks. Usually, some of pressure oil discharged from a hydraulic pump passes through an oil cooler and then the properly-cooled traction oil is supplied to both a trunnion lubricating oil passage and a rolling contact surface lubricating oil passage for lubricating and cooling the power roller and trunnion and for lubricating and cooling the rolling contact surfaces of the power roller and input and output disks. After lubrication, almost all of the oil drains back into an oil reservoir (or an oil tank or an oil pan). However, in the conventional lubricating system of the toroidal CVT as disclosed in JP5-39847, during cold engine start, or when the traction oil is cooled excessively by the oil cooler and the excessively cooled oil is supplied to the rolling contact surfaces, decreasing oil temperature causes a film of oil adhered to the rolling contact surface to thicken and have a thigh coefficient of viscosity. The thicker oil film of the rolling contact surface lowers a traction coefficient. As is generally known, the oil (exactly, traction oil) adhered to the rolling contact surface functions as a power-transmission element, and thus it is necessary to maintain the thickness of the film of traction oil adhered to the rolling contact surface at a proper oil thickness. The oil thickness of traction oil adhered to the rolling contact surface is dependent upon the oil temperature.

SUMMARY OF THE INVENTION

It is desirable that the oil temperature control (or oil temperature management) of oil used for lubrication and cooling required for the moving parts located inside of the power roller is different from the oil temperature control (or oil temperature management) of oil serving as the power-transmission element and adhered to used for the rolling contact surface of the power roller. In particular, when the engine is temporarily stopped under a condition that the toroidal CVT unit is not sufficiently warmed up after the cold engine start-up, a very thick traction oil film is formed on the rolling contact surface. Under this condition, when a selector lever is shifted from a neutral range to a D range or to a R range, in order to prevent slippage between the power roller and input and output disks, it is necessary to increase a spring stiffness of a dished-plate spring pre-loading or biasing the input and output disks in the axial direction, and/or it is necessary to increase the inclination angle of the cam contour surface of a loading cam that axially presses the associated input disk so as to increase a loading force created by the loading cam and varying depending on the magnitude of input torque. Properly increasing the loading force is effective to prevent undesired slippage between the power roller and input and output disks. Excessively increasing the loading force, on the other hand, deteriorates a power transmission efficiency, thus deteriorating fuel economy. To avoid this, if a heater is provided within the oil pan, it takes a long time required to warm a large amount of oil stored in the oil pan. With the heater built in the oil pan, a remarkable effect cannot be brought when the engine is started from a state that the toroidal CVT unit is cold. To produce the remarkable effect of properly warmed-up traction oil, a large capacity of heater must be provided in the oil pan. This is improper from the viewpoint of lightening, increased layout flexibility, reduced production costs, and a reduced storage-battery capacity.

Accordingly, it is an object of the invention to provide a lubricating system for a toroidal continuously variable transmission, which avoids the aforementioned disadvantages.

It is another object of the invention to provide a lubricating system for a toroidal continuously variable transmission equipped with at least a first lubricating circuit for lubrication of rolling contact surfaces of a power roller and input and output disks and a second lubricating circuit for lubrication of moving parts of the power roller and trunnions, which is capable of creating a traction oil film having a proper thickness on the rolling contact surfaces even when an oil temperature is low just after starting wit a cold engine.

In order to accomplish the aforementioned and other objects of the present invention, a lubricating system for a toroidal continuously variable transmission equipped with a trunnion rotatably supporting a power roller gripped between input and output disks so that a gyration angle of the power roller is variable, comprises a first lubricating circuit provided for lubrication of a rolling contact surface on which the input and output disks are in friction-contact with the power roller, a second lubricating circuit provided for lubrication of the trunnion and the power roller, and an oil-temperature control device provided in the first lubricating circuit for heating oil of the toroidal continuously variable transmission, so that the oil temperature-controlled by the oil-temperature control device is supplied through the first lubricating circuit into the rolling contact surface. According to another aspect of the invention, a lubricating system for a toroidal continuously variable transmission equipped with a trunnion rotatably supporting a power roller gripped between input and output disks so that a gyration angle of the power roller is variable, comprises a rolling contact surface lubrication circuit provided for lubrication of a rolling contact surface on which the input and output disks are in friction-contact with the power roller via traction oil, a trunnion lubrication circuit provided for lubrication and cooling of the trunnion and the power roller, and an oil-temperature control means provided in the rolling contact surface lubrication circuit for temperature-controlling the traction oil, so that the traction oil temperature-controlled by the oil-temperature control means is supplied through the rolling contact surface lubrication circuit into the rolling contact surface. According to a further aspect of the invention, a method for independently temperature-controlling traction oil in a dual circuit lubricating system for a toroidal continuously variable transmission equipped with a trunnion rotatably supporting a power roller gripped between input and output disks so that a gyration angle of the power roller is variable, the dual circuit lubricating system having a first lubricating circuit for lubrication of a rolling contact surface on which the input and output disks are in friction-contact with the power roller via the traction oil, a second lubricating circuit for lubrication and cooling of the trunnion and the power roller, an oil heater heating the traction oil and an oil cooler cooling the traction oil, the method comprises detecting a condition of an operating temperature of the toroidal continuously variable transmission, determining, responsively to the condition of the operating temperature detected, as to whether the toroidal continuously variable transmission is in a cold-transmission state or in a hot-transmission state, supplying the traction oil cooled by the cooler via the second lubricating circuit for lubrication and cooling of the trunnion and the power roller, supplying the traction oil temperature-risen by the heater via the first lubricating circuit for lubrication of the rolling contact surface when the toroidal continuously variable transmission is in the cold-transmission state, and supplying the traction oil temperature-fallen by the cooler via the first lubricating circuit for lubrication of the rolling contact surface when the toroidal continuously variable transmission is in the hot-transmission state.

The other objects and features of this invention will become understood from the following description with reference to the accompanying drawings.

DESCRIPTION OF THE PREFERRED EMBODIMENTS

Figure 3:
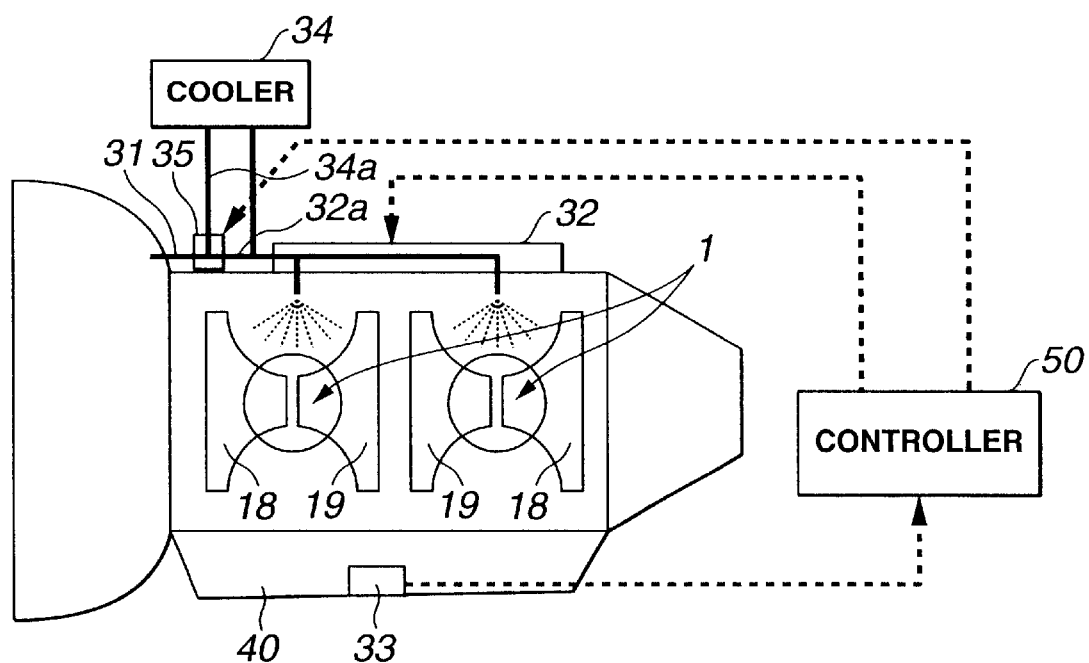
FIG. 3 is a schematic diagram illustrating the fundamental concept of the lubricating oil supply in another embodiment of the heater (32) plus cooler (34) equipped lubricating system of the invention.
Figure 4:
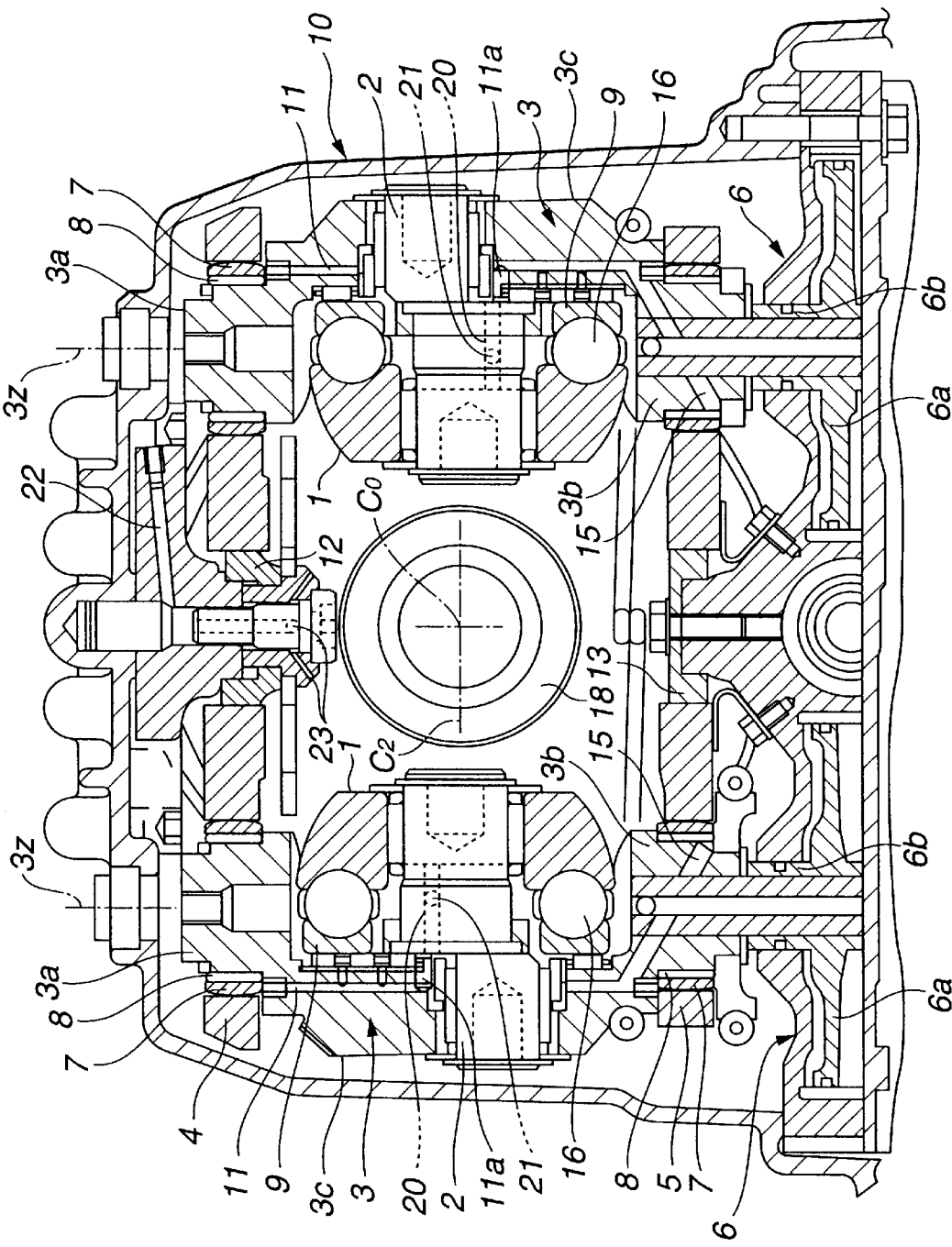
FIG. 4 is a front cross-sectional view of showing the general linkage layout of one variator unit of a double-cavity type toroidal CVT to which the lubricating system of the embodiment is applicable.

Referring now to the drawings, particularly to FIG. 4, there is shown a front view of the linkage layout of a toroidal continuously variable automatic transmission (hereinafter is referred to as "toroidal CVT"). The toroidal CVT includes a pair of input and output disks 18 and 19 whose opposing faces are formed as toroidal grooves, a pair of power rollers (1, 1) reach held or gripped between these disks 18 and 19 so that the inside toroidal surfaces of input and output disks 18 and 19 are brought into contact with the peripheral surface (spherical convex surface) of the associated power roller 1, and a pair of trunnions (3, 3) supporting the power rollers (1, 1). Input and output disks 18 and 19 face each other across a rotation axis Co in a transmission casing 10. In FIG. 4, the output disk is not shown. As shown in FIG. 4, the two trunnions are located at both sides of the rotation axis Co common to the input and output disks. Each of the trunnions is formed at its upper and lower ends with rotation-axis portions 3a and 3b coaxial with a rotation axis 3z formed in transmission casing 10. Rotation axis 3z coaxial with rotation-axis portions 3a and 3b is a trunnion axis about which the trunnion is rotatable. Trunnion 3 also includes an offset portion 3c interconnecting rotation-axis portions 3a and 3b such that power roller 1 is accommodated in an internal space defined between rotation-axis portions 3a and 3b. Offset portion 3c is located in such a manner as to slightly extend outwards from the outer peripheries of the input and output disks. Each power roller 1 is rotatably supported by the trunnion via a pivot shaft 2 being eccentric to its central axis. The power roller rotates about the central axis. The base of eccentric pivot shaft 2 is supported by the offset portion 3c of trunnion 3. A ball bearing 16 and an outer race 19 are interleaved between power roller 1 and offset portion 3c, so that a thrust force applied to the power roller is received by the trunnion. Trunnion 3 is supported in such a manner as to be displaceable in the axial direction of the trunnion axis 3z. A rod 6b of a hydraulic cylinder device 6 is connected to the lower end of trunnion 3. A servo-piston 6a of hydraulic cylinder device 6 is connected to the rod 6b. By virtue of the frictional force produced between the power roller and the input and output disks, engine power (torque) is transmitted from the input disk via traction oil (called "continuously variable transmission fluid" abbreviated to "CVTF") to the output disk, while the power roller rotates about its central axis. Traction oil transmits engine power using it shearing force at high contact pressure. When trunnion 3 is displaced by axial movement of servo piston 6a in the axial direction of trunnion axis 3z from a neutral position that an axis $C_2$ perpendicular to rotation axis Co is identical to the central axis of the power roller, as viewed from the front view of FIG. 4, the input and output disks exert a rotation load on power roller 1 such that the power roller rotates about trunnion axis 3z. Thus, trunnion 3 also rotates about its axis 3z. As a result, the gyration angle of the power roller varies, and therefore the distance (called "output contact radius") from a contact point between power roller 1 and output disk 19 (see FIGS. 2 and 3) to the rotation axis Co and the distance (called "input contact radius") from a contact point between power roller 1 and input disk 18 to the rotation axis Co are changed continuously. In this manner, the transmission ratio of the toroidal CVT, that is, the gear ratio of output contact radius to input contact radius can be varied continuously. In each of the trunnions (3, 3) opposing to each other with respect to the axis Co, its upper rotation-axis portion 3a is joined via a spherical joint 7 and a needle bearing 8 to an upper link 4. The central portion of upper link 4 is rockably or oscillatingly supported by way of a link support 12 provided on the inner periphery of transmission casing 10, with the result that the trunnions (3, 3) and upper link 4 are rockably connected to each other. In the same manner, in each of the trunnions (3, 3) opposing to each other with respect to the axis Co, its lower rotation-axis portion 3b is joined via a spherical joint 7 and a needle bearing 8 to a lower link 5. The central portion of lower link 5 is rockably or oscillatingly supported by way of a link support 13 provided on the inner periphery of transmission casing 10, with the result that the trunnions (3, 3) and lower link 5 are rockably connected to each other. As discussed above, the upper ends of trunnions (3, 3) are interconnected by means of upper link 4, while the lower ends of trunnions (3, 3) are interconnected by means of lower link 51. Thus, the up and down displacements of the trunnions (3, 3) are synchronized with each other. Additionally, upper link 4 serves to hold the distance between the two trunnion axes (3z, 3z) unchanged, against the thrust force applied to the power roller 1 (this thrust force acting in the leftward and rightward directions in FIG. 4). Offset portion 3c of each of the trunnions is formed therein with a trunnion lubricating oil passage 11. As shown in FIG. 4, each trunnion lubricating oil passage 11 is formed in each of right-hand and left-hand trunnion offset portions (3c, 3c), as a vertically-extending bore having upper and lower opening ends. Each trunnion lubricating oil passage 11 is communicated nearby its lower opening end with a pressure-oil supply passage 15, so as to feed pressure oil delivered through oil supply passage 15 to the spherical joint 7 and needle bearing 8 of each of upper and lower links 4 and 5. On the other hand, the power-roller pivot shaft unit containing both the power-roller central shaft portion and pivot shaft portion 2 is formed therein with a bearing lubricating oil passage 20. Bearing lubricating oil passage 20 has an opening end communicating a branched oil passage 11a of trunnion lubricating oil passage 11. Bearing lubricating oil passage 20 has a lubricating-oil supply port 21 facing to the inner periphery of ball bearing 16. With the previously-noted lubricating-oil passage structure, the traction oil (CVTF) pressurized and delivered through trunnion lubricating oil passage 11 is supplied through bearing lubricating oil passage 20 to ball bearing 16, for lubrication and cooling of power roller 1. After lubricating the power roller and ball bearing, a proper amount of oil is further supplied toward the outer peripheries of input disk 18 and output disk 19 depending on rotation of power roller. The proper amount of oil serves to a cooling agent absorbing heat from the outer peripheries of these disks 18 and 19, outside of the friction contact surfaces (rolling contact surfaces) between power roller 1 and input and output disks 18 and 19. The lower end of upper link support 12 for upper link 4 is formed with a plurality of oil-supply nozzles 23, so that oil is directed or supplied via these nozzles toward the rolling contact surfaces between power roller land input and output disks 18 and 19. Each nozzle 23 is communicated with a rolling contact surface lubricating oil passage 22 formed in the upper link support 12, such that the pressure oil fed through rolling contact surface lubricating oil passage 22 is delivered to each nozzle 23.

Figure 1:
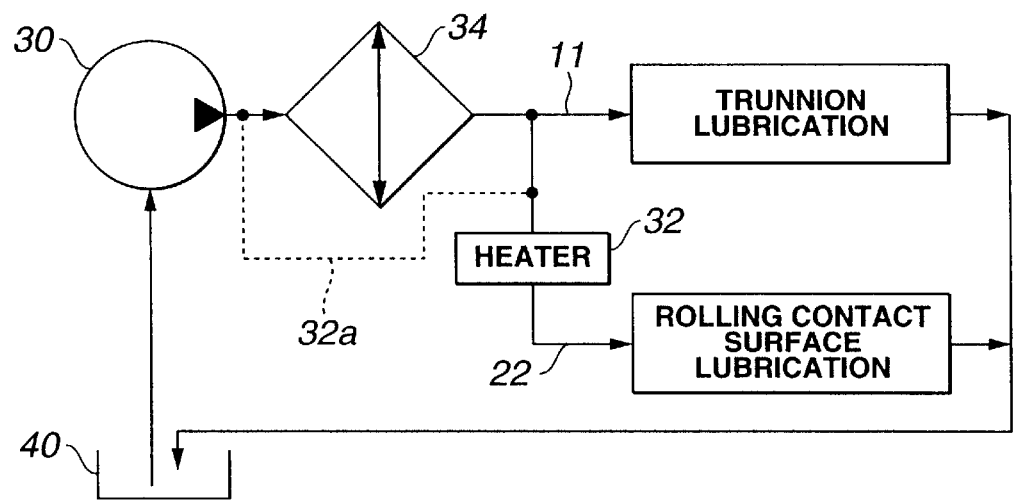
FIG. 1 is a system block diagram showing one embodiment of a lubricating system of a toroidal continuously variable transmission.
Figure 2:
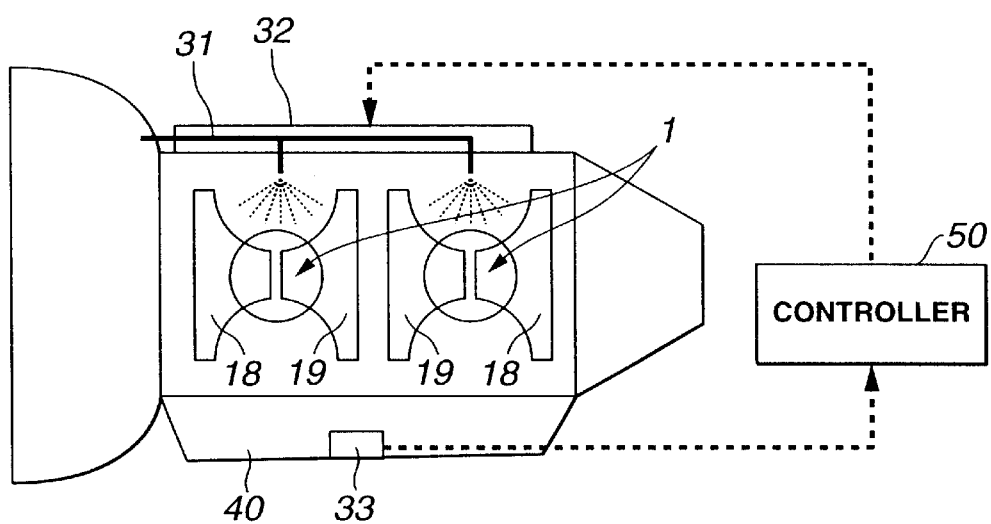
FIG. 2 is a schematic diagram illustrating the fundamental concept of the lubricating-oil supply in the cooler (34) plus heater (32) equipped lubricating system of the embodiment of FIG. 1.

Referring now to FIGS. 1 and 2, there is shown the fundamental concept of the lubricating oil supply of the lubricating system of the embodiment. Oil is directed or supplied via trunnion lubricating oil passage (a second lubricating circuit) 11 toward ball bearing 16 of power roller 1, outer peripheral portions of input and output disks (18,19; 18,19) radially outwardly extending from the rolling contact surfaces, trunnions 3, upper and lower links 4 and 5 for the purpose of lubrication and cooling of them. Nozzles 23 formed in upper link support 12 (that rockably supports the central portion of upper link 4), are directed to inject the oil (CVTF) pressurized through rolling contact surface lubricating oil passage (a first lubricating circuit) 22 toward the rolling contact surfaces of power roller 1 and input and output disks 18 and 19 for lubrication. FIG. 1 shows an example of the improved lubricating system of the embodiment. As shown in FIG. 1, oil (CVTF) is discharged from an oil pump 30 and then supplied into a cooler 34 to produce cooled oil. The cooled oil is supplied via a trunnion lubricating oil passage 11 and used for lubrication and cooling of ball bearing 16 of power roller 1, outer peripheral portions of input and output disks (18,19; 18,19) radially outwardly extending from the rolling contact surfaces, trunnions 3, upper and lower links 4 and 5. This lubrication is often called "trunnion lubrication". The cooled oil is supplied via an oil heater 32 into a rolling contact surface lubricating oil passage 22. The oil warmed up or temperature-controlled (temperature-risen) by the heater 32 is supplied via rolling contact surface lubricating oil passage 22 and used for lubrication of the rolling contact surfaces of power roller 1 and input and output disks 18 and 19. This lubrication is often called "rolling contact surface lubrication". Instead of connecting the inlet port of heater 32 to the downstream line of cooler 34, it is more preferable that the discharge port of oil pump 30 or the upstream line of cooler 34 is connected via an oil passage 32a directly to the inlet port of heater 32 (see the broken line 32a of FIG. 1). Direct connection between the line of the discharge port of oil pump 30 and the inlet port of heater 32 enables a temperature of oil supplied for rolling contact surface lubrication to rapidly rise up to a desired traction-oil temperature required to obtain a high traction coefficient, in particular during cold-engine start. As discussed above, the lubricating system of the embodiment is constructed as a dual circuit lubricating system having the first lubricating circuit for the so-called rolling contact surface lubrication and the second lubricating circuit for the so-called trunnion lubrication. In the first lubricating system, a comparatively high-temperature oil discharged from pump 30 via heater 32 is supplied into rolling contact surface lubricating oil passage 22. In the second lubricating system, a comparatively low-temperature oil discharged from pump 30 via cooler 34 is supplied into trunnion lubricating oil passage 11. In order to control or manage the temperature of oil used for the first lubricating system or circuit (for the rolling contact surface lubrication) independently of the temperature control or temperature management of oil used for the second lubricating system or circuit (for the trunnion lubrication), as shown in FIG. 2, in addition to the heater 32, a temperature sensor 33 and a lubrication controller 50 are provided. As shown in FIG. 2, in the rolling contact surface lubricating system, oil is fed via an oil-supply passage 31 into nozzles 23 formed in upper link support 12. The heater is mounted on the transmission casing in a manner so as to heat the oil flowing through the oil-supply passage 31 toward the nozzles 23. The temperature sensor 33 is provided in the oil pan 40 for detecting or monitoring the condition of the toroidal CVT unit, for example, as to whether the toroidal CVT unit is cold or hot. In the shown embodiment, temperature sensor 33 is constructed as an oil temperature sensor that senses an oil temperature of oil (CVTF) stored in oil pan 40. The input/output interface I/O of lubrication controller 50 receives input information (an input signal) from temperature sensor 33. Then, the I/O of controller 50 is responsive to the input information (the input signal) from the temperature sensor to generate a control signal to heater 32. Therefore, depending upon the input signal from temperature sensor, the heater is properly energized or de-energized. In the shown embodiment, although nozzles 23 are provided in the upper link support of upper link 4, in lieu thereof the nozzles may be provided in the upper link itself or in a tilted-rotation stopper for the power roller. In the shown embodiment, although temperature sensor 33 is provided in the oil pan, in lieu thereof the temperature sensor whose sensing element is mounted in the toroidal CVT unit to detect or sense the actual operating temperature of the toroidal CVT, for example, the temperature of the interior of the CVT or the temperature near the inner wall of the CVT casing, may be used. Alternatively, a component-part temperature sensor may be used to monitor the actual operating temperature of the CVT. For instance, the component-part temperature sensor may be provided at least one of input and output disks 18 and 19, power roller 1, and trunnion 3, to monitor or estimate the condition of the operating temperature of the CVT by sensing or detecting the temperature of at least one of the component parts, that is, input and output disks 18 and 19, power roller 1, and trunnion 3 each exposed to the pressure oil. Actually, lubrication controller 50 determines or discriminates, responsively to the input information (the input signal from temperature sensor 33) regarding which state the CVT is in, as to whether the toroidal CVT unit is cold or hot. For example, when the value of input signal from temperature sensor 33 is below a predetermined temperature threshold value, the controller determines that the CVT unit is in the cold-CVT state. Conversely when the value of input signal from sensor 33 is greater than or equal to the predetermined threshold value, the controller determines that the CVT unit is in the hot-CVT state. When the controller determines that the CVT unit is in the cold-CVT state, the controller generates a control command signal to heater 32 so as to activate the heater and thus to warm up the oil to be supplied to the nozzles. Therefore, even in the cold-CVT state, it is possible to effectively rapidly warm up or heat the oil and to adjustor control the viscosity of the oil to a proper specified viscosity. This temperature control (temperature rise) of the oil to be supplied to the nozzles ensures a proper thickness of a film of oil adhered to the rolling contact surface. Even when an undesirably thick oil film has already been formed on the rolling contact surface, the properly-temperature-controlled (properly-temperature-risen) oil injected from each nozzle 23 functions to vary or adjust the oil film thickness toward the acceptable thickness, while washing away surplus oil adhered to the rolling contact surface. In the cooler plus heater equipped lubricating system of the embodiment, even when the CVT unit is stopped under a condition that the CVT unit is not yet warmed up, at this time the thickness of the oil film adhered to the rolling contact surface tends to be thinner than that of the non-heater equipped lubricating system. That is, the cooler plus heater equipped lubricating system of the embodiment performs the proper oil-film control of traction oil adhered to the rolling contact surface depending upon the condition of the actual operating temperature of the CVT unit. The system of the invention can avoid the traction coefficient from being deteriorated even when the CVT unit is still in the cold-CVT state after starting with a cold engine. Therefore, it is unnecessary to set the loading force at an undesired high value, thereby enhancing a power transmission efficiency of the CVT unit. In the cooler plus heater equipped lubricating system of the embodiment, as can be seen from the diagram of FIG. 2, only the oil-supply passage 31 is efficiently heated by heater 32. It is possible to set a design capacity of the heater to a comparatively small capacity. Thus, the system of the embodiment has several advantages, namely lightening, increased layout flexibility, reduced production costs, and a reduced storage-battery capacity.

Referring now to FIG. 3, there is shown another embodiment of the cooler plus heater equipped lubricating system of the invention. In the system of the embodiment shown in FIG. 3, inlet and outlet ports of oil cooler 34 are connected to oil-supply line 31 so as to cool the oil passing through oil-supply line 31. A directional control valve 35 is provided upstream of oil cooler 34 and fluidly disposed at the branched point at which the oil supplied from oil pump 30 to oil-supply line 31 is distributed into an oil line 34a of the cooler side communicating the inlet port of oil cooler 34 and an oil line 32a of the heater side. Directional control valve 35 performs the switching operation between first and second operating modes in response to a control signal from controller 50. During the first operating mode (in the hot-CVT state), the directional control valve is switched to its first valve position to direct the oil flow from oil-supply line 31 toward the oil line 34a of the cooler side. When the controller determines, responsively to the input signal from temperature sensor 33, that the CVT unit is in the hot-CVT state, in other words, when the oil temperature sensed by sensor 33 is greater than or equal to the predetermined temperature threshold value, the controller generates the control signal corresponding to the first operating mode. During the second operating mode (in the cold-CVT state), the directional control valve is switched to its second valve position to direct the oil flow from oil-supply line 31 toward the oil line 32a of the heater side not through the cooler. When the controller determines, responsively to the input signal from temperature sensor 33, that the CVT unit is in the cold-CVT state, in other words, when the oil temperature value sensed by sensor 33 is less than the predetermined temperature threshold value, the controller generates the controls signal switching the directional control valve to the second operating mode. In the system of the embodiment shown in FIG. 3, the oil line of the cooler side interconnecting the outlet port of cooler 34 and oil-supply line 31 is connected to oil line 32a of the heater side upstream of the heater. In lieu thereof, to enhance the cooling effect, it is more preferable that the oil line of the cooler side interconnecting the outlet port of cooler 34 and oil-supply line 31 is connected to rolling contact surface lubricating oil passage 22 downstream of the heater, so that the oil cooler by-passes the heater. In the system of the embodiment of FIG. 3, even when the CVT unit comes into operation from the cold-CVT state, according to the second operating mode oil properly heated or temperature-controlled (temperature-risen) by heater 32 is injected via the nozzles toward the rolling contact surfaces, thus preventing the film of oil adhered to the rolling contact surface from undesirably thickening. On the other hand, when the temperatures of the CVT component parts, namely input and output disks 18 and 19, and power rollers 1, tend to excessively rise during high engine load, according to the first operating mode oil is effectively temperature-controlled (temperature-fallen) by the cooler and thus it is possible to effectively prevent the CVT component-parts temperature from undesirably rising. As can be appreciated from the above, according to the system of the present invention, it is possible to control or maintain the traction coefficient of the traction oil (CVTF) within a predetermined traction-coefficient range by means of the oil-temperature control device (containing the oil heater as well as the oil cooler), irrespective of the condition of the operating temperature of the CVT, that is, irrespective of whether the CVT unit is in the hot-CVT state or in the cold-CVT state.

The entire contents of Japanese Patent Application No. P2000-200460 (filed Jul. 3, 2000) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A lubricating system for a toroidal continuously variable transmission equipped with a trunnion rotatably supporting a power roller gripped between input and output disks so that a gyration angle of the power roller is variable, comprising:
    a first lubricating circuit provided for lubrication of a rolling contact surface on which the input and output disks are in friction-contact with the power roller;
    a second lubricating circuit provided for lubrication of the trunnion and the power roller; and an oil-temperature control device provided in the first lubricating circuit for heating oil of the toroidal continuously variable transmission, so that the oil temperature-controlled by the oil-temperature control device is supplied through the first lubricating circuit into the rolling contact surface.

2. The lubricating system as claimed in claim 1, further comprising:

a temperature sensor detecting a condition of an operating temperature of the toroidal continuously variable transmission; and a lubrication controller being responsive to an input signal from the temperature sensor, to switch the oil-temperature control device to an operative state.

3. The lubricating system as claimed in claim 2, further comprising:

an oil cooler provided in the first lubricating circuit and by-passing the oil-temperature control device, and a directional control valve fluidly disposed at a branched point of the cooler by-passing the oil-temperature control device and switched between first and second valve positions in response to a control signal generated from the lubrication controller based on the input signal from the temperature sensor so as to direct the oil cooled by the cooler to the rolling contact surface with the directional control valve held at the first valve position, and to direct the oil heated by the heater to the rolling contact surface with the directional control valve held at the second valve position.

4. The lubricating system as claimed in claim 3, in which the temperature sensor comprises:

a temperature sensor whose sensing element is mounted in the toroidal continuously variable transmission to sense a temperature of an interior of the toroidal continuously variable transmission.

5. The lubricating system as claimed in claim 3, in which the temperature sensor comprises:

an oil temperature sensor that senses an oil temperature of the oil stored in an oil pan.

6. The lubricating system as claimed in claim 3, in which the temperature sensor comprises:

a component-part temperature sensor that estimates the condition of the operating temperature of the toroidal continuously variable transmission by sensing a temperature of at least one of the input and output disks, the power roller, and the trunnion each exposed to the oil.

7. A lubricating system for a toroidal continuously variable transmission equipped with a trunnion rotatably supporting a power roller gripped between input and output disks so that a gyration angle of he power roller is variable, comprising:

a rolling contact surface lubrication circuit provided for lubrication of a rolling contact surface on which the input and output disks are in friction-contact with the power roller via traction oil;

a trunnion lubrication circuit provided for lubrication and cooling of the trunnion and the power roller; and an oil-temperature control means provided in the rolling contact surface lubrication circuit for temperature-controlling the traction oil, so that the traction oil temperature-controlled by the oil-temperature control means is supplied through the rolling contact surface lubrication circuit into the rolling contact surface.

8. The lubricating system as claimed in claim 7, further comprising:

a temperature sensor means detecting a condition of an operating temperature of the toroidal continuously variable transmission; and a lubrication controller determining, responsively to input information from the temperature sensor means regarding which state the toroidal continuously variable transmission is in, as to whether the toroidal continuously variable transmission is in a cold-transmission state or in a hot-transmission state, the lubrication controller controlling switching between operative and inoperative states of the oil-temperature control means, depending upon whether the toroidal continuously variable transmission is in the cold-transmission state or in the hot-transmission state.

9. The lubricating system as claimed in claim 8, in which the oil-temperature control means comprises an oil heater and an oil cooler.

10. The lubricating system as claimed in claim 9, in which, the lubrication controller switches the heater to the operative state and switches the cooler to the inoperative state to heat the traction oil, when the toroidal continuously variable transmission is in the cold-transmission state.

11. The lubricating system as claimed in claim 10, in which the lubrication controller switches the heater to the inoperative state and switches the cooler to the operative state to cool the traction oil, when the toroidal continuously variable transmission is in the hot-transmission state.

12. The lubricating system as claimed in claim 9, in which the cooler is provided in the rolling contact surface lubrication circuit and by-passing the heater, and which further comprises:

a directional control valve fluidly disposed at a branched point of the cooler by-passing the heater and switched between first and second valve positions in response to a control signal generated from the lubrication controller based on the input information from the temperature sensor means so as to direct the traction oil cooled by the cooler to the rolling contact surface with the directional control valve held at the first valve position when the toroidal, continuously variable transmission is in the hot-transmission state, and to direct the traction oil heated by the heater to the rolling contact surface with the directional control valve held at the second valve position when the toroidal continuously variable transmission is in the cold-transmission state.

13. A method for independently temperature-controlling traction oil in a dual circuit lubricating system for a toroidal continuously variable transmission equipped with a trunnion rotatably supporting a power roller gripped between input and output disks so that a gyration angle of the power roller is variable, the dual circuit lubricating system having a first lubricating circuit for lubrication of a rolling contact surface on which the input and output disks are in friction-contact with the power roller via the traction oil, a second lubricating circuit for lubrication and cooling of the trunnion and the power roller, an oil heater heating the traction oil and an oil cooler cooling the traction oil, the method comprising:

detecting a condition of an operating temperature of the toroidal continuously variable transmission;

determining, responsively to the condition of the operating temperature detected, as to whether the toroidal continuously variable transmission is in a cold-transmission state or in a hot-transmission state;

supplying the traction oil cooled by the cooler via the second lubricating circuit for lubrication and cooling of the trunnion and the power roller;

supplying the traction oil temperature-risen by the heater via the first lubricating circuit for lubrication of the rolling contact surface when the toroidal continuously variable transmission is in the cold-transmission state; and supplying the traction oil temperature-fallen by the cooler via the first lubricating circuit for lubrication of the rolling contact surface when the toroidal continuously variable transmission is in the hot-transmission state.

14. The method as claimed in claim 13, further comprising:

injecting the traction oil, flowing through the first lubricating circuit for lubrication of the rolling contact surface and temperature-controlled independently of the traction oil flowing through the second lubricating circuit for lubrication and cooling of the trunnion and the power roller, toward the rolling contact surface so as to maintain a traction coefficient of the traction oil adhered to the rolling contact surface within a predetermined traction-coefficient range.

* * * * *